United States Patent [19]

Tezuka

[11] Patent Number: 4,717,204
[45] Date of Patent: Jan. 5, 1988

[54] RECLINING ANGLE ADJUSTMENT DEVICE
[75] Inventor: Takeshi Tezuka, Fujisawa, Japan
[73] Assignee: Shiroki Kinzoku Kogyo Kabushiki Kaisha, Fujisawa, Japan
[21] Appl. No.: 41,619
[22] Filed: Apr. 22, 1987

Related U.S. Application Data

[63] Continuation of Ser. No. 755,145, Jul. 15, 1985, abandoned.

[30] Foreign Application Priority Data

Aug. 10, 1984 [JP] Japan .................. 59-123342[U]

[51] Int. Cl.⁴ .................. A47C 1/025; B60N 1/06
[52] U.S. Cl. .................. 297/362; 297/367; 297/369; 297/379
[58] Field of Search .................. 297/361, 362, 366-369, 297/378, 379, 330, 354, 355

[56] References Cited

U.S. PATENT DOCUMENTS 4,227,741 10/1980 Gross et al. .................. 297/362
4,382,630 5/1983 Weston .................. 297/379 X

FOREIGN PATENT DOCUMENTS 2059496 4/1981 United Kingdom .................. 297/361
2078850 1/1982 United Kingdom .................. 297/355
2107386 4/1983 United Kingdom .................. 297/362

Primary Examiner—Kenneth J. Dorner
Assistant Examiner—Peter R. Brown
Attorney, Agent, or Firm—Finnegan, Henderson, Farabow, Garrett & Dunner

[57] ABSTRACT

A reclining angle adjustment device has a pawl angularly movably mounted on a lower arm, an upper arm pivotally mounted by an angularly movable shaft on the lower arm and having an inner gear, an intermediate gear plate having an outer gear meshing with the inner gear and a rack engageable with the pawl, and a release lever angularly movably mounted on the upper arm for releasing the pawl out of mesh with the rack for roughly adjusting the angle of inclination of the upper arm. The angularly movable shaft, the inner gear, and the outer gear jointly constitute a planetary gear mechanism. A control handle is rotatably mounted on the lower arm and operatively connected through the planetary gear mechanism to the upper arm in power-transmitting relation for finely adjusting the angle of inclination of the upper arm. The planetary gear mechanism is sandwiched between the lower arm and a subplate fixed to the lower arm, the subplate having an annular flange having a central hole through which the angularly movable shaft extends. The release lever is angularly movably mounted on and around the annular flange.

2 Claims, 3 Drawing Figures

RECLINING ANGLE ADJUSTMENT DEVICE

This application is a continuation of application Ser. No. 755,145, filed July 15, 1985 now abandoned.

BACKGROUND OF THE INVENTION

The present invention relates to a reclining angle adjustment device for adjusting the angle of inclination of the seat back of a reclining seat in a motor vehicle, i.e., the reclining angle of the reclining seat.

There are known reclining angle adjustment devices in which the reclining angle is finely adjusted by means of a planetary gear mechanism composed of an angularly movable shaft, an outer gear, and an inner gear, and the reclining angle is roughly adjusted by a pawl and ratch mechanism. Such reclining angle adjustment devcies, especially designed for a compact size and improved operability, have a release lever supported on the angularly movable shaft.

The reclining angle adjustment devices include a spring for normally urging the release lever in one direction to keep the pawl in engagement with the latch. Under the biasing force of the spring, there is produced a large force acting between the release lever and the shaft when the release lever is not operated. Therefore, the release lever and the shaft as they are in contact with each other are subject to an increased resistance. This increased resistance requires a large force to be applied to operate a control handle when the reclining angle is to be finely adjusted.

SUMMARY OF THE INVENTION

It is an object of the present invention to provide a reclining angle adjustment device which requires a small force with which to operate a control handle.

Another object of the present invention is to provide a reclining angle adjustment device of a relatively simple structure which requires a small force with which to operate a control handle.

According to the present invention, there is provided a reclining angle adjustment device including a first arm, a pawl angularly movably mounted on the first arm, a second arm pivotally mounted by an angularly movable shaft on the first arm and having an inner gear, an intermediate gear plate having an outer gear meshing with the inner gear and a rack engageable with the pawl, a release lever angularly movably mounted on the second arm for releasing the pawl out of mesh with the rack for roughly adjusting the angle of inclination of the second arm, the angularly movable shaft, the inner gear, and the outer gear jointly constituting a planetary gear mechanism, a control handle rotatably mounted on the first arm and operatively connected through the planetary gear mechanism to the second arm in power-transmitting relation for finely adjusting the angle of inclination of the second arm, and a subplate fixed to the first arm, the planetary gear mechanism being sandwiched between the first arm and the subplate, the subplate having an annular flange having a central hole through which the angularly movable shaft extends, the release lever being angularly movably mounted on and around the annular flange.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
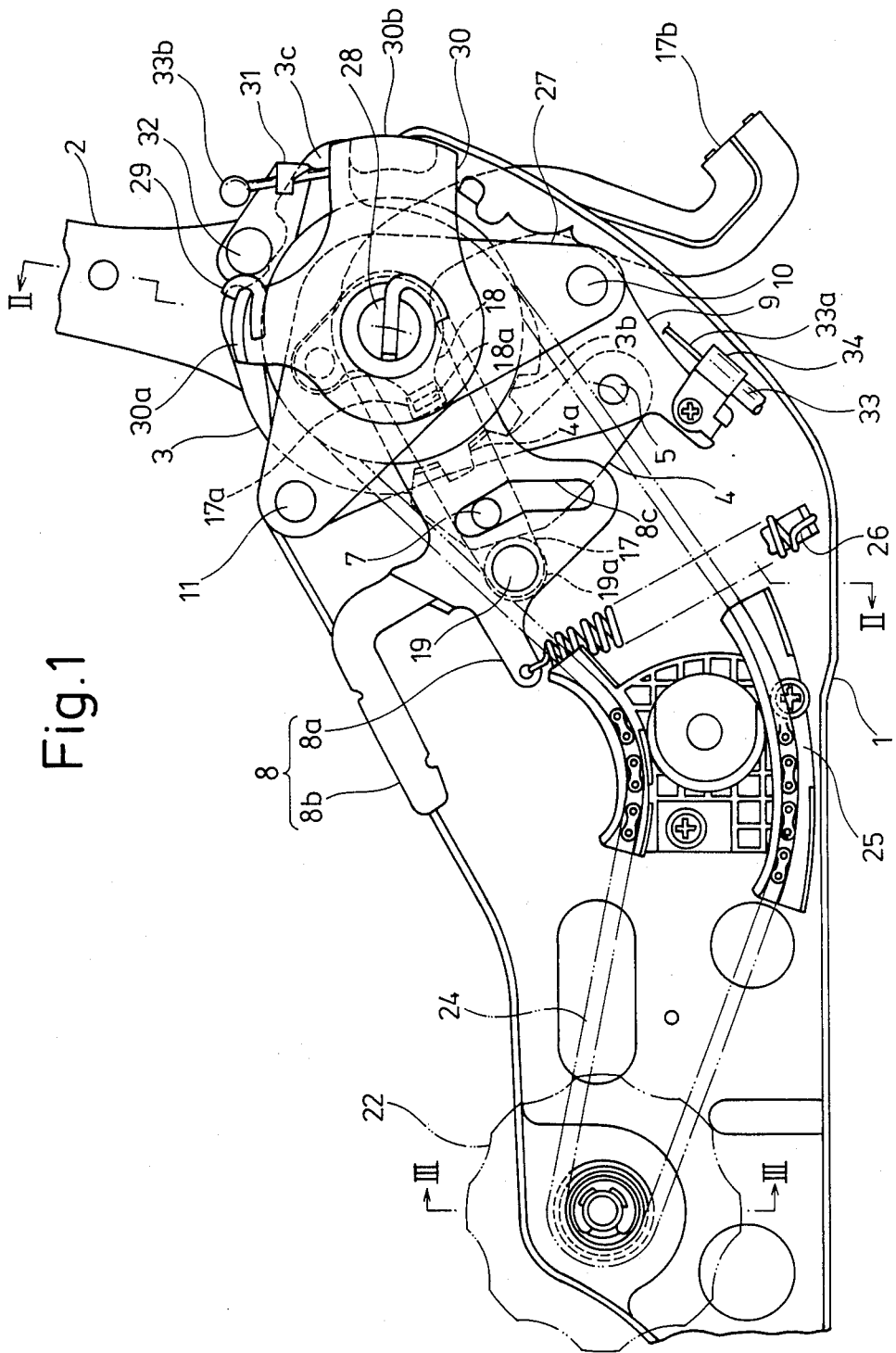
FIG. 1 is a side elevational view of a reclining angle adjustment device according to the present invention.
Figure 2:
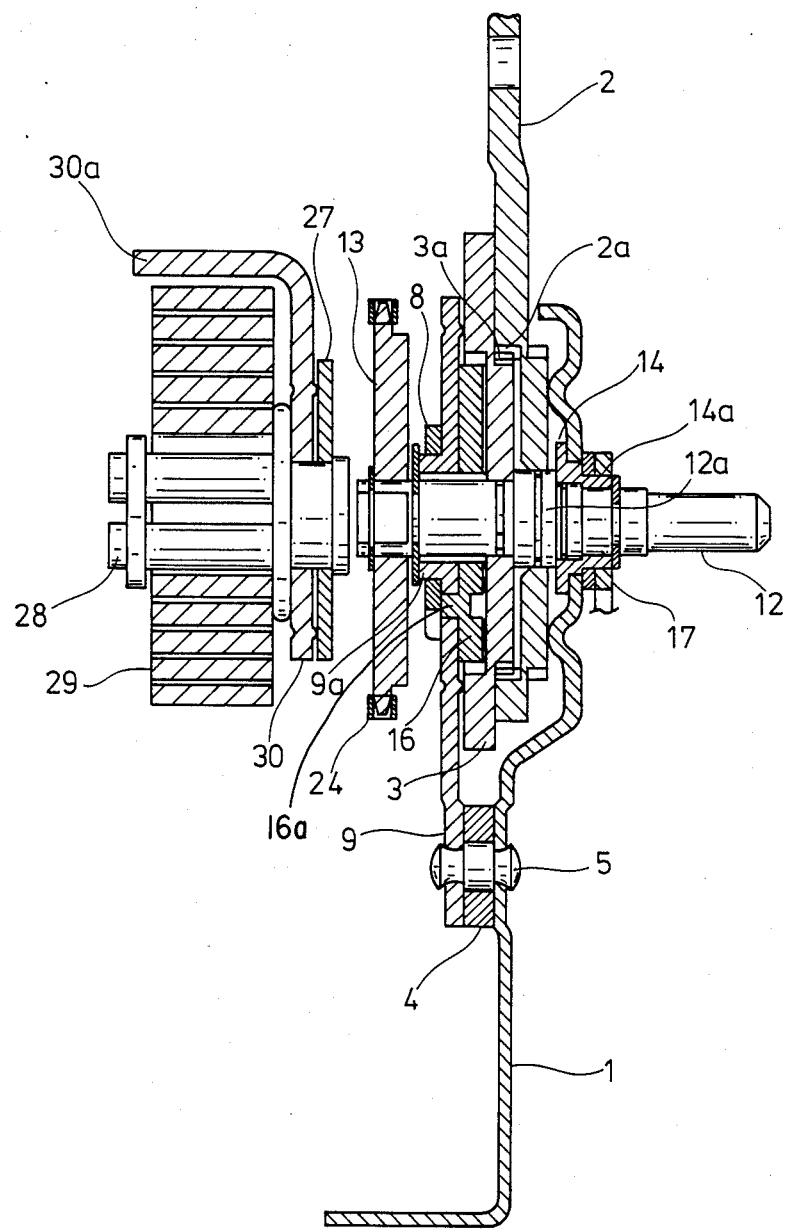
FIG. 2 is an enlarged cross-sectional view taken along line II—II of FIG. 1.
Figure 3:
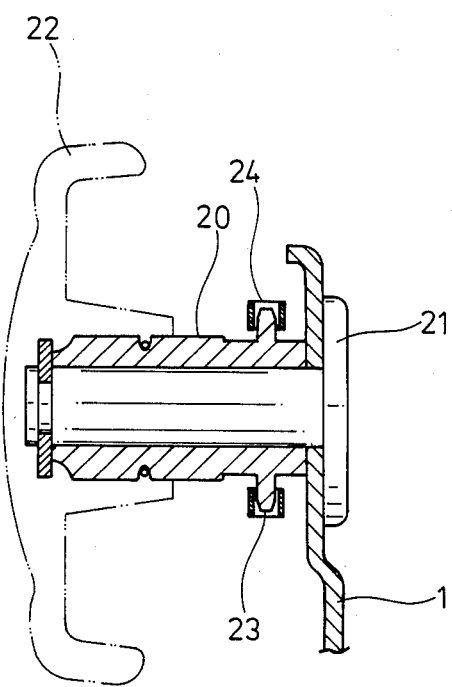
FIG. 3 is an enlarged cross-sectional view taken along line III—III of FIG. 1.

FIGS. 1 through 3 illustrate a reclining angle adjustment device according to the present invention, for use with a reclining seat in a vehicle, the reclining angle adjustment device having a walk-in pedal. The reclining angle adjustment device includes lock mechanisms on both sides, or outer and inner sides, of the reclining seat. The lock mechanism on the inner side is omitted from illustration as it is substantially the mirror image of that on the outer side.

The reclining angle adjustment device includes a lower arm 1 fixed as by screws to the seat cushion frame (not shown) of a reclining seat, and an upper arm 2 fixed as by screws to the seat back frame (not shown) of the reclining seat. The upper arm 2 has an inner gear 2a embossed on a side thereof as by precision pressing. The upper arm 2 has a circular hole 2e defined in an upper portion thereof as an attachment hole for passage therethrough of the fastener toward the seat back frame. An intermediate gear plate 3 is disposed adjacent to the upper arm 2 and has an outer gear 3a embossed as by precision pressing on a side thereof facing the inner gear 2a of the upper arm 2. The intermediate gear plate 3 also has a rack 3b on an outer edge thereof. In the illustrated embodiment, the rack 3b is composed of a first tooth for holding the seat back in an intermediate position and a second tooth for holding the seat back in a rearwardly tilted position. However, the rack 3b may be composed of three or more teeth. The number of teeth of the inner gear 2a is selected to be at least one larger than the number of teeth of the outer gear 3a.

A pawl 4 is pivotally mounted on the lower arm 1 by a stepped pin 5 and has locking teeth 4a for engaging the rack 3b of the intermediate gear plate 3. A pin 7 is mounted on the pawl 4 near the locking teeth 4a and projects in a direction away from the lower arm 1, the pin 7 being inserted in a cam slot 8c defined in an intermediate portion 8a of a release lever 8. A subplate 9 is positioned more closely than the release lever 8 to the lower arm 1. The subplate 9 has attachment holes corresponding in position to the stepped pin 5 and stepped pins 10, 11, and is secured through the attachment holes to the lower arm 1 to prevent the upper arm 2, the intermediate gear plate 3, and the pawl 4 from being disassembled. An annular flange 9a is burred out of the subplate 9, the release lever 8 being angularly movably mounted on and around the annular flange 9a. An angularly movable shaft 12 includes an eccentric portion 12a disposed partially on a concentric portion thereof.

For assembly, the concentric portion of the angularly movable shaft 12 is angularly movably inserted through a bushing 14 secured to the lower arm 1, a central hole defined in the intermediate gear plate 3 in concentric relation to the outer gear 3a, a central hole of the flange 9a of the subplate 9, and a hole in a guide plate 16 attached to the subplate 9. The eccentric portion 12a of the angularly movable shaft 12 is angularly movably inserted through a hole defined in the upper arm 2 in concentric relation to the inner gear 2a. A sprocket 13 is mounted on one end of the concentric portion of the angularly movable shaft 12 for angular movement therewith. Thus, the upper arm 2 and the intermediate gear plate 3 are angularly movably mounted respectively on the eccentric portion 12a and the concentric portion of the angularly movable shaft 12, and the inner gear 2a and the outer gear 3a are held in mesh with each other, thereby providing a planetary gear mechanism. The planetary gear mechanism is clamped in position between the lower arm 2 and the subplate 9. The outer circumferential surface of the bushing 14 which is fitted in the lower arm 1 is serrated and firmly fixed to the lower arm 1 so as not to allow the bushing 14 to turn with respect to the lower arm 1. The guide plate 16 has a plurality of projections, and the subplate 9 has a plurality of corresponding through holes. The guide plate 16 and the subplate 9 are securely coupled to each other by inserting the projections 16a into the through holes, respectively. The guide plate 16 has an outer circumferential surface fitted in a recess defined in the intermediate gear plate 3 remotely from the outer gear 3a thereof, thereby supporting the intermediate gear plate 3. The central through hole in the intermediate gear plate 3 is of a diameter slightly larger than the outside diameter of the angularly movable shaft 12, and hence the intermediate gear plate 3 is not supported by the angularly movable shaft 12.

A release arm plate 17 is angularly movably mounted on an end 14a of the bushing 14 and has an extension 17b extending downwardly to the right in FIG. 1 to serve as a walk-in pedal. The release arm plate 17 also has in its intermediate portion a hole 17a in which there is fitted a hook 18a of a hook plate 18 fixed to a connecting pipe (not shown) for rough adjustment of the reclining angle of the reclining seat. The connecting pipe serves to transmit the motion of the release lever 8 to the release lever of the identical lock mechanism disposed on the inner side of the reclining seat. Although not shown, a connecting bar for fine adjustment is connected to the angularly movable shaft 12 for transmitting the motion of the angularly movable shaft 12 to the lock mechanism on the inner side of the reclining seat. The release arm plate 17 has its distal end secured by a stepped pin 19 to the intermediate portion 8a of the release lever 8. A roller 19a is fitted over the stepped pin 21 and held against the back of the pawl 4 to maintain the locking teeth 4a of the pawl 4 and the rack 3b of the intermediate gear plate 3 in reliable mesh with each other.

A handle shaft 20 is angularly movably mounted on the lower arm 1 by a hinge shaft 21. A control handle 22 is attached to one end of the handle shaft 20, and a sprocket 23 is mounted on an intermediate portion of the handle shaft 20 for rotation therewith.

A chain 24 is trained around the sprockets 23, 13 and has intermediate portions guided by chain guides 25 mounted on the lower arm 1. A spring 26 acts between the release lever 8 and the lower arm 1 for normally urging the pawl 4 to turn in a direction to mesh with the intermediate plate 3. A pin bracket 27 is secured by the stepped pins 10, 11 to the lower arm 1, with a grooved pin 28 fixed to the pin bracket 27. A balancing spiral spring 29 has an inner end disposed in the longitudinal groove of the pin 28. A hook plate 30 is angularly movably mounted on the pin 28. The spiral spring 29 has an outer end held in engagement with a hook 30a of the hook plate 30. The hook plate 30 also has a bent portion 30b with its side held against a hook 3c of the intermediate gear plate 3.

A cable attachment bracket 31 is fixed to the upper arm 2 by a pin 32. When the upper arm 2 is tilted in a forward direction, the bracket 31 pulls the cable end 33b of an inner cable member 33a of a walk-in control cable 33 out of an outer cable sheath thereof. An end of the walk-in control cable 33 is fixed to the subplate 9 by a bracket 34.

The lock mechanism on the inner side of the reclining seat is substantially the same as that described above. However, since the release lever is operated only on the outer side of the reclining seat, the inner lock mechanism does not have the control portion 8b of the release lever 8, the extension 17b of the release arm plate 1, and the control handle 24.

Operation of the reclining angle adjustment device thus constructed is as follows: In the position shown in FIG. 1, the locking teeth 4a of the pawl 4 mesh with the rack 3b of the intermediate gear plate 3 to lock the gear plate 3. Therefore, the outer gear 3a is fixed with respect to the lower arm 1. By turning the control handle 22, the angularly movable shaft 12 is turned about its own axis through the chain 24, and the upper arm 2 is also turned at a prescribed speed-reduction ratio through the planetary gear mechanism. Accordingly, the reclining angle can be adjusted finely.

For rough adjustment of the reclining angle, the control portion 8b of the release lever 8 is turned clockwise in FIG. 1 by the passenger on the reclining seat. The pin 19 and the roller 19a are also turned clockwise in a direction to disengage from the pawl 4. (The lower arm 1 has oblong holes defined therein to allow the pins 7, 19 to move therein for permitting the roller 22 to turn as described above.) The pin 7 in the cam slot 8c now moves toward the control handle 24. The locking teeth 4a are then brought out of mesh with the rack 3b of the intermediate gear plate 3, which is now unlocked. Thus, the reclining angle can now be roughly adjusted, or the seat back can be quickly tilted as desired. The lock mechanism on the inner side of the reclining seat operates in the same manner.

When a passenger wishes to walk into or out of the vehicle behind the reclining seat, the walk-in pedal 17b is pushed downwardly in FIG. 1. When the walk-in pedal 17b is depressed, the release arm plate 17 is turned clockwise in FIG. 1 to move the pin 7 in the cam slot 8c toward the control handle 22. The locking teeth 4a of the pawl 4 are now brought out of mesh with the rack 3b of the intermediate gear plate 3, thus unlocking the intermediate gear plate 3. Therefore, the seat back coupled to the upper arm 2 is tilted in the forward direction under the force of the spiral spring 29 to cause the cable attachment bracket 31 to pull the inner cable member 33a of the walk-in control cable 33. The reclining seat is then unlocked from a seat track (not shown), and is bodily moved in the forward direction.

The release lever 8, when not in operation, is stopped when the roller 19a pushes the back of the pawl 4 under the force of the spring 26 to turn the pawl 4 clockwise in FIG. 1. At this time, the release lever 8 is subject to a moment about the pin 19 directly under the resiliency of the spring 26. The release lever 8 is also pulled in a direction along the straight line connecting the axial centers of the roller 19a and the angularly movable shaft 12 under the force acting between the roller 19a and the pawl 4. Therefore, there is a large force acting between the release lever 8 and the shaft portion on which the release lever 8 is mounted. In conventional reclining angle adjustment devices, the release lever 8 is supported directly on the angularly movable shaft 12. Therefore, a large frictional force is generated between the release lever 8 and the shaft 12, with the result that the passenger is required to impose a large force to turn the shaft 12 in a fine adjustment process. With the arrangement of the present invention, however, the release lever 8 is supported on the annular flange 9a of the subplate 9, and is not held in direct contact with the shaft 12. Consequently, the reclining angle adjustment device of the invention is free from the problem of the prior devices. During rough adjustment of the reclining angle, a large control force can be applied by the release lever 8 since the control portion 8a thereof is disposed remotely from the center of turning movement of the release lever 8, and hence the frictional force between the release lever 8 and the flange 9a is negligible.

In the conventional reclining angle adjustment devices, a frictional force is produced between the intermediate gear plate 3 and the angularly movable shaft 12 during a fine adjustment process. Such a frictional force should preferably be removed, though it is of a less importance than the aforesaid frictional force. With the illustrated embodiment, the intermediate gear plate 3 is angularly movably supported by the guide plate 16 to prevent any frictional force from being produced between the intermediate gear plate 3 and the angularly movable shaft 12. Since the reclining angle adjustment device of the present invention has a walk-in mechanism, the release arm plate 17 is provided in the device. The release arm plate 17 is angularly movably supported by the bushing 14 so that no frictional force will be generated between the release arm plate 17 and the angularly movable shaft 12.

With the arrangement of the present invention, the reclining angle adjustment device is of a simple structure for allowing the control handle to be operated with a small manual force.

Although a certain preferred embodiment has been shown and described, it should be understood that many changes and modifications may be made therein without departing from the scope of the appended claims. For example, while the lock mechanisms have been described as being provided on the outer and inner sides of the reclining seat, only the outer lock mechanism may be provided and the reclining seat may only be hinged on the inner side thereof. In the illustrated embodiment, the upper arm is remotely controlled by the chain transmission mechanism for finely adjusting the reclining angle. However, the upper arm can be remotely controlled by a belt transmission device composed of a belt and pulleys or a grooved belt and grooved pulleys, or other transmission devices. The control handle 22 may directly be attached to the angularly movable shaft 12.

What is claimed is:

1. A reclining angle adjustment device comprising:
   (a) a first arm;
   (b) a pawl angularly movably mounted on said first arm;
   (c) a second arm pivotably mounted by an angularly movable shaft on said first arm, said second arm having an inner gear;
   (d) an intermediate gear plate having an outer gear meshing with said inner gear of said second arm;
   (e) a rack provided on an outer edge of said intermediate gear plate and engageable with said pawl;
   (f) a release lever angularly movably mounted on said second arm for releasing said pawl out of mesh with said rack for roughly adjusting the angle of inclination of said second arm;
   (g) a control handle rotatably mounted on said first arm and operatively connected to said second arm in power-transmitting relation for finely adjusting the angle of inclination of said second arm through a planetary gear mechanism, including said angularly movable shaft and said inner gear and said outer gear, and through a chain being trained around a first sprocket mounted on a handle shaft of said control handle and a second sprocket mounted on said angularly movable shaft; and
   (h) a subplate secured to said first arm with said planetary gear mechanism being sandwiched between said first arm and said subplate, said subplate having a burred-out annular flange with a central hole having a diameter slightly larger than that of said angularly movable shaft and through which said angularly movable shaft extends, said release lever being angularly movably mounted on and around said annular flange, said intermediate gear plate having a recess defined in a surface thereof remote from said outer gear thereof and substantially coaxial therewith and a guide plate fitted in said recess and fixed to said subplate to support said intermediate gear plate for angular movement on said subplate.

2. A reclining angle adjustment device according to claim 1, wherein a chain guide is provided in said first arm.

* * * * *